US012758985B2

(12) United States Patent
Franzke et al.

(10) Patent No.: US 12,758,985 B2
(45) Date of Patent: Oct. 13, 2026

(54) MEASURING GAS PRESSURE IN A SOLID BOWL SCREW CENTRIFUGE

(71) Applicant: GEA WESTFALIA SEPARATOR GROUP GMBH, Oelde (DE)

(72) Inventors: Torsten Franzke, Oelde (DE); Volker Knospe, Münster (DE)

(73) Assignee: GEA Westfalia Separator Group GmbH, Oelde (DE)

( * ) Notice: Subject to any disclaimer, the term of this patent is extended or adjusted under 35 U.S.C. 154(b) by 477 days.

(21) Appl. No.: 18/563,483

(22) PCT Filed: May 19, 2022

(86) PCT No.: PCT/EP2022/063573
§ 371 (c)(1),
(2) Date: Nov. 22, 2023

(87) PCT Pub. No.: WO2022/248331
PCT Pub. Date: Dec. 1, 2022

(65) Prior Publication Data

US 2024/0238806 A1 Jul. 18, 2024

(30) Foreign Application Priority Data

May 25, 2021 (DE) ..................... 10 2021 113 425.0

(51) Int. Cl.
*B04B 1/20* (2006.01)
*B04B 7/08* (2006.01)
*F16J 15/40* (2006.01)

(52) U.S. Cl.
CPC .................. *B04B 1/20* (2013.01); *B04B 7/08* (2013.01); *F16J 15/40* (2013.01)

(58) Field of Classification Search
CPC .... B04B 1/20; B04B 7/08; B04B 7/00; B04B 9/12; F16J 15/40; F16J 15/3204; F16J 15/406
See application file for complete search history.

(56) References Cited

U.S. PATENT DOCUMENTS 2,634,907 A * 4/1953 Smith ........................ A23L 2/76 494/32
3,729,128 A 4/1973 Reed
(Continued)

FOREIGN PATENT DOCUMENTS

CN 112228565 A 1/2021
DE 2212165 A 9/1972
(Continued)

OTHER PUBLICATIONS

International Search Report and Written Opinion mailed Oct. 24, 2022 in related/corresponding International Application No. PCT/EP2022/063573.

(Continued)

*Primary Examiner* — Charles Cooley
(74) *Attorney, Agent, or Firm* — PATENT PORTFOLIO BUILDERS PLLC

(57) ABSTRACT

A solid bowl screw centrifuge has a rotatable drum, a screw arranged in the drum and rotatable relative to the rotatable drum with a differential speed, one or more drum bearings for bearing the drum, a sealing assembly arranged between a drum shaft portion and the housing for protecting at least one of the drum bearings from an ingress of constituents of a suspension. Each sealing assembly includes at least two radial shaft sealing rings arranged with a mutual axial spacing so as to form at least one chamber. Respective radial shaft sealing rings are arranged such that their respective sealing lips are directed away from the respective chamber.

(Continued)

A gas source having a gas pressure can impinge on the respective chamber.

4 Claims, 5 Drawing Sheets

(56) References Cited

U.S. PATENT DOCUMENTS

| | | | | |
|---|---|---|---|---|
| 8,127,420 | B2 | 3/2012 | Hasenzahl | |
| 10,639,648 | B2 * | 5/2020 | Ostkamp | F16C 33/6659 |
| 2016/0310969 | A1 * | 10/2016 | Ostkamp | F16C 33/667 |
| 2017/0292612 | A1 * | 10/2017 | Rippel | F16J 15/004 |
| 2024/0238806 | A1 * | 7/2024 | Franzke | F16J 15/3204 |

FOREIGN PATENT DOCUMENTS

| | | | | |
|---|---|---|---|---|
| DE | 3430508 | A1 | 2/1986 | |
| DE | 102007012232 | A1 | 9/2008 | |
| GB | 1389832 | A | 4/1975 | |
| WO | WO-2007040427 | A1 * | 4/2007 | F16C 19/54 |

OTHER PUBLICATIONS

Search Report created Mar. 28, 2022 in related/corresponding DE Application No. 10 2021 113 425.0.

* cited by examiner

MEASURING GAS PRESSURE IN A SOLID BOWL SCREW CENTRIFUGE

BACKGROUND AND SUMMARY OF THE INVENTION

Exemplary embodiments of the invention relate to a solid bowl screw centrifuge, as well as to a method for operating such a solid bowl screw centrifuge.

Solid bowl screw centrifuges are used to separate or clarify a suspension into at least one liquid phase and one solid phase. In such solid bowl screw centrifuges, radial shaft sealing rings are often used to protect one or more bearings, in particular rolling bearings, against penetration of the suspension. Here, for example, a sealing cage of the radial shaft sealing ring is inserted into a bearing housing, while a sealing lip rests on a rotary shaft. Due to the high circumferential speeds reached by the shafts of the solid bowl screw centrifuge during operation, the sealing lip of a radial shaft sealing ring is subject to considerable wear.

To ensure a sufficient sealing function of a radial shaft sealing ring, the sealing lip is pressed against the running surface or counter-sealing surface of the rotary shaft. The contact force can be generated via the elastic sealing lip, which in the unmounted state has a smaller diameter than the diameter of the shaft forming the counter-sealing surface. During assembly of such a radial shaft sealing ring, the elastic sealing lip is expanded to the shaft diameter, wherein the restoring force of the elastic sealing lip generates the desired contact pressure or desired surface pressure of the sealing lip. The contact pressure can also be increased by a ring or coil spring.

The higher the contact force of the sealing lip is selected, the higher the frictional power of the sealing lip and thus the heat input into the shaft bearing. The resulting increase in bearing temperature is undesirable. The main factors influencing friction losses are the design of the radial shaft sealing ring used, the material of the sealing lip and the contact force with which the sealing lip is pressed onto the shaft, the speed at which the shaft rotates, the precision with which the shaft was manufactured, as well as the surface quality of the shaft or the counter-sealing surface and the type of lubrication of the bearing points to be sealed.

According to literature data, the friction losses of a radial shaft sealing ring with a diameter of 110 mm and a shaft speed of 6500 1/min can amount to about 700 W and are thus not insignificant.

In addition, the wear of a radial shaft sealing ring in a solid bowl screw centrifuge is increased when a suspension to be clarified reaches the radial shaft sealing rings, especially if it is an abrasive suspension such as sewage sludge.

Only when the bearing is damaged due to leakage does this lead to detectable vibrations, noise or a significant increase in temperature. These indirect consequences of seal leakage can be monitored. The current degree of wear and thus the presumed time of failure of a radial shaft sealing ring in a solid bowl screw centrifuge cannot be detected or estimated or predicted automatically in the sense of predictive maintenance.

DE 34 30 508 A1 describes a filter centrifuge for separating solid and liquid components in a suspension with a rotating drum having filtrate passages. The drum of the centrifuge is mounted in rolling bearings on a machine frame together with a shaft carrying the drum. The rolling bearings are sealed with at least one seal arranged between the shaft and the machine frame to protect against the ingress of suspension components. The protective effect of the seal is particularly high because the seal comprises two radial shaft sealing rings arranged at a mutual axial distance from one another to form an intermediate space on the shaft, and the intermediate space is vented to the atmosphere by a venting channel. One of the disadvantages of this solution is that it is not possible to estimate or predict the total failure of a radial shaft sealing ring.

An example of the prior art is US 2016/0310969 A1, in which a bearing of a decanter is cooled, which is arranged between two radial shaft sealing rings. A chamber between these seals is cooled with fluid that is fed into the chamber and discharged from it again.

DE 2 212 165 A discloses a sealing assembly for a shaft in which two radial shaft sealing rings are arranged in opposite directions. These seals thus delimit a chamber. Air, for example, is fed into the chamber through a bore and a throttle. The gas pressure in the chamber is adjusted so that gas escapes under the sealing lips of the radial shaft sealing rings.

Against this background, exemplary embodiments of the invention are directed keeping the wear of the radial shaft sealing rings low in a simple manner. In addition, according to a further development, the predictability of a total failure of a radial shaft sealing ring is to be improved.

Thus, a solid bowl screw centrifuge is provided for separating an inflowing suspension into at least one liquid phase and at least one solid phase, comprising at least:

a. a rotatable drum having an axis of rotation, wherein the drum has a cylindrical portion and a conical portion,
b. at least one feed for a suspension, at least one liquid drain and at least one solid discharge,
c. a screw arranged in the drum and rotatable relative to the rotatable drum with a differential speed,
d. at least one or more drum bearings for bearing the drum in a housing,
e. at least one or more screw bearings for bearing the screw in the drum,
f. at least one sealing assembly arranged between a drum shaft portion and the housing for protecting at least one of the bearings, in particular at least one of the drum bearings, in particular against ingress of constituents of the suspension,
g. wherein the respective sealing assembly comprises at least two radial shaft sealing rings arranged with a mutual axial spacing to form at least one respective chamber,
h. wherein a gas pressure can be applied to the respective chamber by means of a gas source, so that a current gas pressure $P_{akt}$ is established therein during operation,
i. wherein the respective radial shaft sealing rings are arranged such that their respective sealing lips are directed away from the respective chamber,
j. wherein the chamber can be pressurized with the gas pressure by means of a control and/or regulating device and the gas source, wherein the gas pressure in the respective chamber can be varied by means of the control and/or regulating device, and
k. wherein the respective line has a pressure measuring device and/or a pressure sensor with which the current gas pressure in or outside the respective chamber can be measured or sensed.

This advantageous embodiment and a corresponding method open up a wide variety of options.

A pressure measurement in the respective chamber becomes possible in a constructively simple manner and thus advantageously. The pressure measuring device can be used to determine the gas pressure $P_{akt}$ in the chamber and/or in a space adjacent to the chamber. The pressure measuring device can be operatively connected to the control and/or regulating device.

In this way, it is possible to reduce the wear of the radial shaft sealing rings in a simple manner, since it is possible to easily detach them during operation from the shaft against which their free ends otherwise bear, to such an extent that friction and the associated wear in this area are reduced.

Since a gas source is connected to the line, a structurally simple possibility is created to pressurize the—optionally respective—chamber with gas pressure. This design can then be used to advantageously determine the current degree of wear of the seals and to estimate or predict the total failure of a seal, so that predictive maintenance of the seals is possible.

It is preferred that one of the sealing assemblies is arranged on each side of the respective bearing to be protected and that the respective sealing lips of the radial shaft sealing rings of the respective chamber are directed away from the respective chamber in the opposite direction. In this way, the bearing is protected axially on both sides by one of the advantageous sealing assemblies in each case.

It is advantageous as well as simple if the respective chamber can be pressurized with the gas pressure via a bore and/or a line in each case.

It is also advantageous and simple to provide an orifice plate between the gas source and the sealing assemblies of the respective chamber.

According to an embodiment, a method for operating a solid bowl screw centrifuge is provided, which is designed according to a claim referring thereto, in which method an inflowing suspension Su is separated into at least one liquid phase FI and at least one solid phase Fe, wherein during the separation in the respective chamber of the at least one sealing assembly with, in each case, two radial shaft sealing rings a gas pressure $P_{akt}$ is generated by a gas source operatively connected to the respective chamber, wherein the gas pressure $P_{akt}$ is increased at least up to a gas pressure $P_{max}$ at which the radial contact of the respective sealing lip is overcome, so that a gas leakage at the sealing lips of the respective radial shaft sealing ring starts at a leakage pressure $P_{max}$. The current leakage pressure $P_{akt}$, which corresponds to the current gas pressure $P_{akt}$ in the chamber, is measured and the currently measured leakage pressure $P_{akt}$ is compared with at least one stored reference value. Then the current state of wear of the respective sealing lip or the sealing assembly is determined and/or evaluated on the basis of the comparison of the currently measured leakage pressure $P_{akt}$ with the at least one stored reference value.

According to an embodiment, a method for operating a solid bowl screw centrifuge is also provided, which is designed according to one of the claims referring thereto, in which method an inflowing suspension Su is separated into at least one liquid phase FI and at least one solid phase Fe, wherein during the separation in the respective chamber of the at least one sealing assembly with in each case two radial shaft sealing rings a gas pressure $P_{akt}$ is generated by a gas source operatively connected to the respective chamber, wherein the respective chamber is acted upon by the gas pressure through a respective orifice plate and respectively so that the feed volume is limited by the respective orifice plate, and wherein the feed pressure $P_{zu}$ upstream of the respective orifice plate is set at least temporarily in such a way that the radial contact of the respective sealing lip is overcome by the gas pressure $P_{akt}$ in the chamber, so that gas leakage at the sealing lips of the respective radial shaft sealing ring begins at a leakage pressure $P_{max}$. The current leakage pressure $P_{akt}$, which corresponds to the current gas pressure $P_{akt}$ in the chamber, is measured and the currently measured leakage pressure $P_{akt}$ is compared with at least one stored reference value. Then the current state of wear of the respective sealing lip or the sealing assembly is determined and/or evaluated on the basis of the comparison of the currently measured leakage pressure $P_{akt}$ with the at least one stored reference value.

In this way, the wear of the respective sealing rings can be reduced or is reduced in operation.

The gas pressure can be advantageously adjusted individually according to the requirements of the radial shaft sealing rings installed and the size of the respective centrifuge.

The gas pressure $P_{zu}$ is thereby increased—for example by the control and/or regulating device and the gas source—for a new set of seals up to a gas pressure $P_{max}$ at which gas leakage of a sealing lip of the respective radial shaft sealing ring begins. This creates a reference value for the maximum pressure and then also for the leakage pressure $P_{max}$ in a simple manner.

The amount of the leakage pressure $P_{max}$ is stored as a reference value—in particular in the control and/or regulating device. This means that the reference value can be called up at any time for comparison purposes.

The current leakage pressure $P_{max}$ is measured in each case. This allows the current condition of the seal to be easily and thus advantageously mapped.

Since the currently measured leakage pressure $P_{max}$ is compared with at least one stored reference value for the leakage pressure $P_{max}$, it is possible to draw conclusions about the current state of wear of the seal in a simple and thus advantageous manner.

In particular, the current state of wear of the respective sealing lip is determined and/or evaluated. This is carried out by comparing the current leakage pressure with one or more stored reference values so that a remaining service life of the seal can be specified. This advantageously enables predictive maintenance of the seal.

According to a variant, the orifice plate in the respective gas line is initially dimensioned such that a defined small gas quantity can escape through the respective sealing lips. This is because the gas quantity/time supplied into the respective chamber can be limited by the orifice plate in each case at a constant feed pressure $P_{zu}>P_{max}$. A leakage gas flow results if the feed pressure is greater than the leakage pressure $P_{max}$, wherein a relatively constant gas flow can occur depending on the orifice plate opening. Behind the orifice plate or in the chamber, the leakage gas flow is thus established, which in turn can depend on the state of wear on the sealing lips. The measured value of this gas pressure can be compared in a controller with stored reference values for the leakage pressure. This allows conclusions to be drawn about the state of wear of the seal or the sealing assembly. A gas pressure control device and flow measurement are not required here, so that this method can be designed to be particularly simple.

BRIEF DESCRIPTION OF THE DRAWING FIGURES

In the following, the invention is described in more detail with reference to the drawing by means of exemplary embodiments. The invention is not limited to these exemplary embodiments, but can also be implemented differently within the scope of the claims. In addition, individual features of the following exemplary embodiments can also be combined individually with other exemplary embodiments in each case, wherein:

The terms "right", "left", "horizontal", "vertical" used in the following refer to the respective drawing plane.

DETAILED DESCRIPTION

Figure 1:
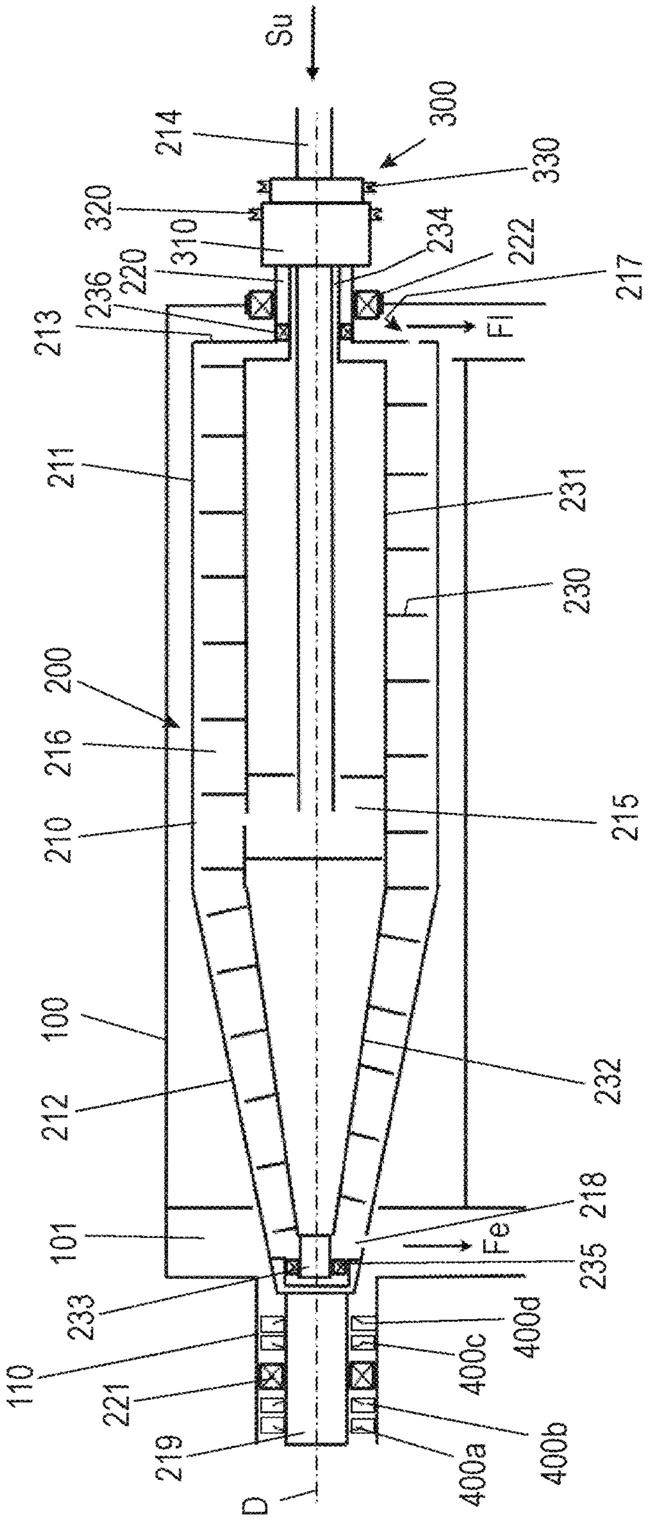
FIG. 1 shows a schematic, sectional view of a solid bowl screw centrifuge.

FIG. 1 shows a solid bowl screw centrifuge having a frame that is not rotatable or rotating during operation and preferably a housing 100 and a rotor 200 that is rotatable or rotating during operation.

The rotor 200 has a rotatable drum 210 with an axis of rotation D that is horizontal here. However, the axis of rotation D can also be oriented differently in space, in particular vertically. The rotor 200 also includes a screw 230 arranged in the drum 210, the axis of rotation of which corresponds to that of the drum 210. In operation, the screw 230 can be rotated at a differential speed with respect to the drum 210.

The drum 210 has a portion 211 that is cylindrical here on the inside and outside, and a portion 212 that is conical here on the inside and outside that axially adjoins the cylindrical portion 211. The cylindrical portion 211 is terminated by a drum cover 213 that extends substantially radially.

Here, the screw 230 also has an at least externally cylindrical portion 231 and an at least externally conical portion 232 axially adjoining it. It is arranged inside the drum 210. The drum 201 is rotatable in operation. In addition, the screw 230 is rotatable in operation. Preferably, the two elements drum 210 and screw 230 are rotated at a differential speed with respect to each other during operation. One or more corresponding drives, e.g., electric motors, are used for rotation.

A feed pipe 214 extends into the drum 210, here concentrically to the axis of rotation, and opens into a distributor 215, through which a suspension Su to be processed can be fed radially into a centrifugal chamber 216 of the drum 210.

The feed pipe 214 may either be guided into the drum 210 from the side of the cylindrical drum portion 211, or it may be guided into the drum 210 from the side of the conical drum portion 212.

One or more liquid drains 217 may be formed in or on the drum cover 213. These can be formed in various ways, for example as openings in the drum cover 213, which have a type of overflow weir, or in other ways, for example as a peeling disc. In the area of, in particular at the end of the conical portion 212, at least one solid discharge 218 is formed.

As a rule, the drum 210 is designed as a solid bowl. In the rotating drum 210, at least the suspension is then clarified or separated into at least one liquid phase Fl and a solid phase Fe. The at least one liquid phase Fl exits the liquid drain 217 at the drum cover 213. The solid phase or the solids Fe are transported on the other hand by the screw 230 in the direction of the solid discharge 218, where it is ejected from the drum 210.

Axially adjoining the drum cover 213 or the actual drum 210 is a first drum shaft portion 220, which is non-rotatably connected to the drum 210. A second drum shaft portion 219 axially adjoins the conical drum portion 212 and is also connected to the drum 210 in a rotationally fixed manner.

The cylindrical portion 231 of the screw 230 is axially adjoined by a first screw shaft portion 234, which is non-rotatably connected to the screw 230, and the conical drum portion 232 is axially adjoined by a second screw shaft portion 233, which is also non-rotatably connected to the screw 230.

Here, the axis of rotation D is aligned horizontally. The axis of rotation can also be aligned vertically or at an angle (not shown here). The drum and/or the screw can also be mounted on one side.

A drive device 300 with one or two motors (not shown here) is used to drive the rotor 200. At least one transmission 310 can be connected downstream of the drive device 300. Two belt pulleys 320, 330 are schematically shown here as an example, indicating that the transmission 310 can have at least two interfaces for feeding a respective torque of the electric motor or motors into the transmission 310 in order to drive the drum and the screw.

Alternatively (not shown here), the rotor can also be driven by other means, e.g., hydraulic motors, so that a transmission may not be required. The drive can also be provided by a combination of electric motor(s) and hydraulic motor(s), in which case other transmissions are used and the pulleys are completely or partially omitted.

Thus, the drive here rotates the drum 210 on the one hand and the screw 230 on the other hand. For this purpose, the transmission 310 here has two output shafts. The first output shaft is coupled in a rotationally fixed manner to the first drum shaft portion 220 or directly to the drum 210, and the second output shaft is coupled directly or indirectly in a rotationally fixed manner to the first screw shaft portion 234 or directly to the screw 230.

The drum 210 and the shaft are each rotatably supported by two drum bearings 221, 222 arranged axially in the direction of the axis of rotation. In this respect, the term "bearing" is not to be understood too narrowly. Each of the bearings 221, 222 may each comprise one or more individual bearings, which are then arranged axially directly adjacent to one another such that they can each be functionally regarded as a single bearing. The bearings 221, 222 can also be designed as bearings of various types, such as rolling bearings—in particular ceramic bearings, hybrid ceramic bearings, magnetic bearings or plain bearings.

The drum bearings 221, 222 are arranged between the drum 210 and the frame 100 or a part connected to the frame so that the drum 210 can be rotated relative to the frame 100. In this regard, the drum bearings 221, 222 are preferably arranged radially between the drum 210 and the frame 100 or a part connected to the frame.

In contrast, the screw bearings 235, 236 are arranged radially between the screw 230 and the drum 210 so that the screw 230 is rotatable relative to the drum 210. Here, the screw bearings 235, 236 are preferably arranged radially between the drum 210 and the screw 230.

In one possible embodiment variant (not shown), the one of the screw bearings 235 in the region of the solid discharge 218 may be omitted. In this case, the rotating screw centers itself independently, which is known, for example, in a vertical arrangement of the decanter.

Axially to the left and right of one of the bearings, in particular the drum bearings—here exemplarily next to the drum bearing 221 on the conical drum portion 212—at least one sealing assembly—here two sealing assemblies—is arranged. This is intended to seal the respective bearing to which it is assigned, in particular against penetration of suspension or suspension constituents, during processing of the suspension. The bearing to be protected can be protected axially by one of the sealing assemblies or arranged between two sealing assemblies. Alternatively, it can also be protected axially on one side only by a single sealing assembly (not shown here).

The respective sealing assembly has, in each case, two radial shaft sealing rings 400*a, b*, and 400*c, d*, respectively, which are each arranged at a mutual axial distance to form a chamber 402*a, b* between the two radial shaft sealing rings 400*a, b*. Radially inwardly, the respective chamber 402*a* bounds the shaft 219 or a part of this shaft. Radially outwardly, it may be additionally bounded by the ring or sleeve portion 110. Here, one of the two sealing assemblies seals the drum bearing 221 axially against a collecting chamber 101 for the solid phase Fe and the other sealing assembly seals it axially towards the other side, e.g., towards the surroundings. In this respect, the respective sealing assembly 400 acts to protect the drum bearing 221, 222 against the ingress of constituents of the suspension Su from the corresponding axial side.

A radial shaft sealing ring 400 within the terms of this specification is a seal used to seal rotating elements, such as rotary shafts, particularly those rotatably supported in an annular or sleeve portion 110 of the housing 100.

To this end, the respective radial shaft sealing rings 400 include a sealing lip 401 that rests on the surface of the rotary shaft. The sealing lip 401 is designed to press radially on the shaft surface or a shaft sleeve 405, so that a sealing force is generated which acts on the shaft or the shaft sleeve 405 and thus a sealing effect is generated. A hose spring or screw spring may also be provided for this purpose. The radial shaft rings may have a reinforcing ring made of metal, for example. Outwardly, they are fixed in the ring or sleeve portion 110.

Figure 2:
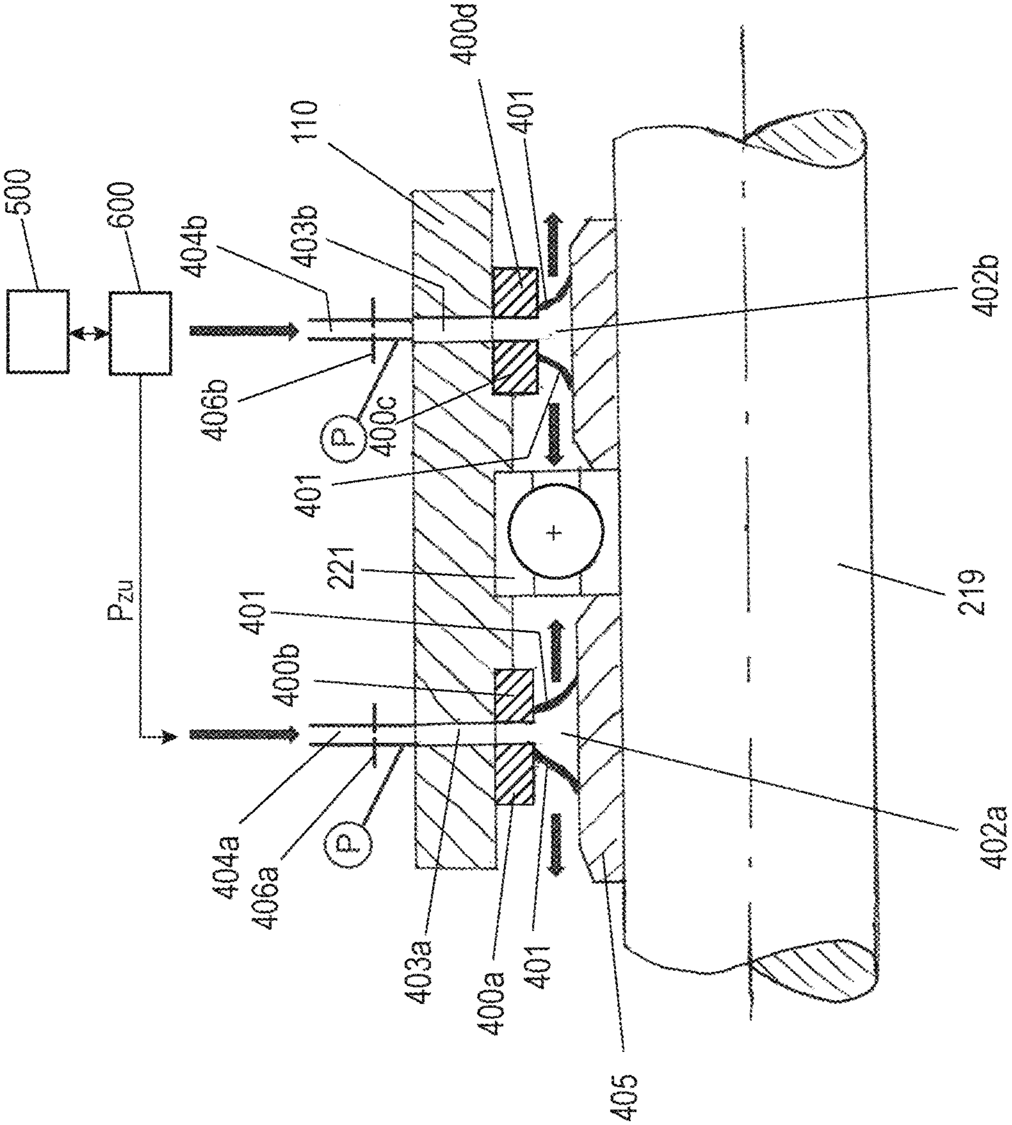
FIG. 2 shows a section of a drum shaft bearing of a solid bowl screw centrifuge, in particular of the type shown in FIG. 1.

The above-mentioned bearing position is shown enlarged in FIG. 2. Axially to the left and right of the drum bearing 221, the four radial shaft sealing rings 400*a, b, c, d* are each arranged in pairs, thus forming two of the sealing assemblies here.

In particular, the radial shaft rings 400*a, b, c, d* may be fixed (radially outwardly) to a surrounding ring or sleeve portion 110, which may be an element of the frame or housing, for example.

The sealing lips 401 of one pair each of radial shaft sealing rings 400*a, b* and 400*c, d*, respectively, are here in contact with a respective shaft sleeve 405, which is fitted on the drum shaft portion 219. The shaft sleeve 405 forms in each case the running surface or counter-sealing surface of the pairs of radial shaft sealing rings 400*a, b, c, d*. The pairs of radial shaft sealing rings 400*a, b* or 400*c, d* are aligned in such a way that the sealing lips 401 of the respective pair face outwardly, i.e., face away from the respective chamber 402*a, b*.

The respective chamber 402*a, b* is bounded laterally by the sealing lips 401 of the two radial shaft sealing rings 400*a, b* and 400*c, d*, respectively, and radially inwardly by the drum shaft portion 219 and/or the respective shaft sleeve 405. Radially outwardly, it may further be bounded by the annular portion 110. A supply line for a gas opens into the chamber. This may be supplied from a gas source 600. The gas source may be a compressed air tank and/or a compressor.

It is advantageously provided that the respective sealing lips 401 of the radial shaft sealing rings 400*a, b* and 400*c, d*, respectively, of the respective chamber 402*a, b* are each directed away from the respective chamber 402*a, b* in opposite directions, so that the two sealing lips 401 can each be lifted radially outwardly by a gas pressure in the chamber. The sealing lips 401 describe a kind of arc transitioning from the radial direction to an axial direction, wherein they can abut the rotating element with the axial portion inside. The axial ends or portions of the two sealing lips 401 on one of the chambers 402*a, b* are thus directed outwardly away from each other. If they were directed inwardly toward each other, they could not be lifted by a gas pressure in the chamber 402*a, b*, but would actually be pressed more firmly against the rotating element as the gas pressure increased.

The gas source 600 may, for example, be provided downstream with a valve that can be controlled by the control and/or regulating device 500. The compressor 600 can also be controlled by the control and/or regulating device 500 (schematically indicated in FIG. 2 but not shown in detail).

A bore 403*a, b* in the ring or sleeve portion 110 opens into the respective chamber 402*a, b* here, to which a line 404*a, b* can be connected, which leads up to the gas source 600. Via the line 404*a, b* and here the bore 403*a, b*, the respective chamber 402*a, b* can be pressurized from the gas source 600, for example a compressed air source, with a gas pressure $P_{zu}$, from which a current gas pressure $P_{akt}$ in the chamber 402*a, b* results.

It may have a pressure measuring device or a pressure sensor with which the gas pressure $P_{akt}$ in the respective chamber 402*a, b* can be measured or sensed. This may be provided, for example, in the respective line 404*a, b*. The gas for generating the gas pressure is provided by means of the gas source 600. This can be designed to be controllable.

Figure 3:
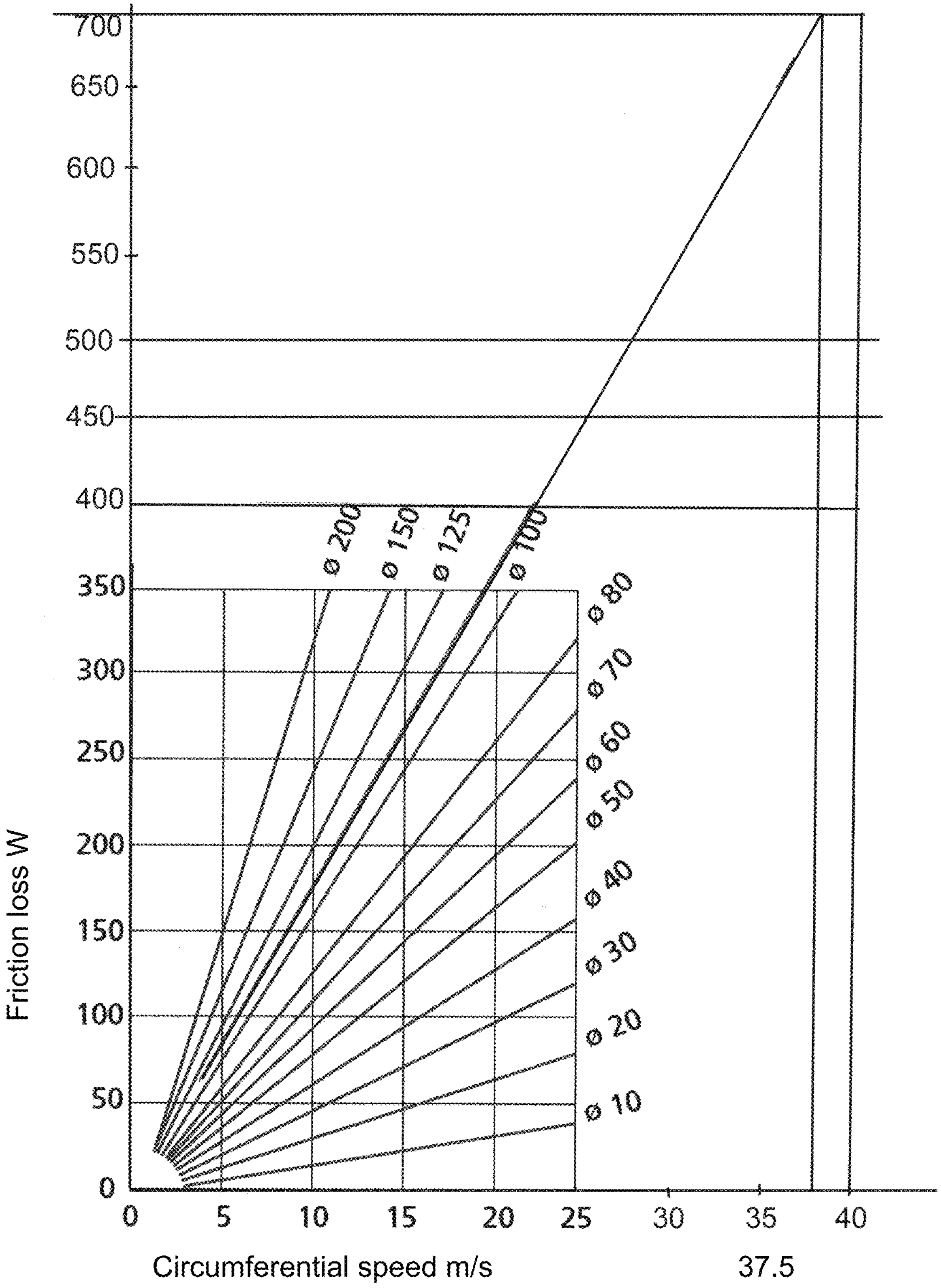
FIG. 3 shows a diagram illustrating the friction loss versus circumferential speed of a radial shaft sealing ring of the solid bowl screw centrifuge of FIG. 1.

As can be seen in FIG. 3, the contact pressure of the sealing lip 401 forms a parameter for the amount of friction losses. If a gas pressure $P_{akt}$ is now applied to the respective chamber 402*a, b*, the sealing lip 401 is lifted by the gas pressure $P_{akt}$ due to its shape and arrangement (sealing lip faces outwards). Thus, the gas pressure $P_{akt}$ counteracts the contact pressure of the respective sealing lip 401 and thus reduces the contact pressure of the sealing lip 401 on the shaft sleeve 405 or the drum shaft portion 219 and thus the friction losses.

In the case of a pair of radial shaft sealing rings 400*a, b* and 400*c, d*, respectively, each with an intact sealing lip 401, a certain gas pressure $P_{akt}=P_{max}$ in the respective chamber 402*a, b* causes the sealing lip 401 to lift off the shaft sleeve 402 or the drum shaft portion 219. This then results in a corresponding gas leakage.

The gas pressure $P_{akt}$ can be changed with the aid of a corresponding control and/or regulating device, with which, for example, a valve downstream of the gas pressure source or a compressor (not shown here) is controlled. The gas pressure $P_{akt}$ can thus be increased in the respective chamber 402*a, b* with a new sealing lip 401 up to a gas pressure $P_{max}$ at which leakage begins.

As the wear of the sealing lip 401 progresses, the measured value for the gas pressure $P_{max}$ at which leakage starts becomes smaller and smaller and can be compared in the control and/or regulating device 500 (which is in particular a computer with interfaces and a memory) with reference values for the gas pressure $P_{max}$ at which leakage should start. From this, a conclusion can be drawn as to the state of wear of the respective sealing lip 401. In this procedure, pressure control and flow measurement are also required in addition to pressure measurement.

Alternatively, the gas volume/time supplied to the respective chamber 402*a, b* can be limited in each case by an orifice plate 406*a, b* at a constant feed pressure $P_{zu}>P_{max}$. In this case, a leakage gas flow results since the feed pressure $P_{zu}$ is greater than the leakage pressure $P_{max}$ so that, depending on the orifice plate opening, a relatively constant gas flow occurs which overcomes the respective sealing lip 401.

Behind the orifice plate or in the respective chamber 402*a, b*, a current gas pressure or leakage pressure $P_{akt}$ is set, which depends on the state of wear of the respective sealing lip 401. The measured value of this gas pressure in the respective chamber 402*a, b* can be compared with reference values in a control system and provides an indication of the state of wear of the respective sealing lip 401. A pressure regulating device and flow rate measurement are not required here.

Figure 4:
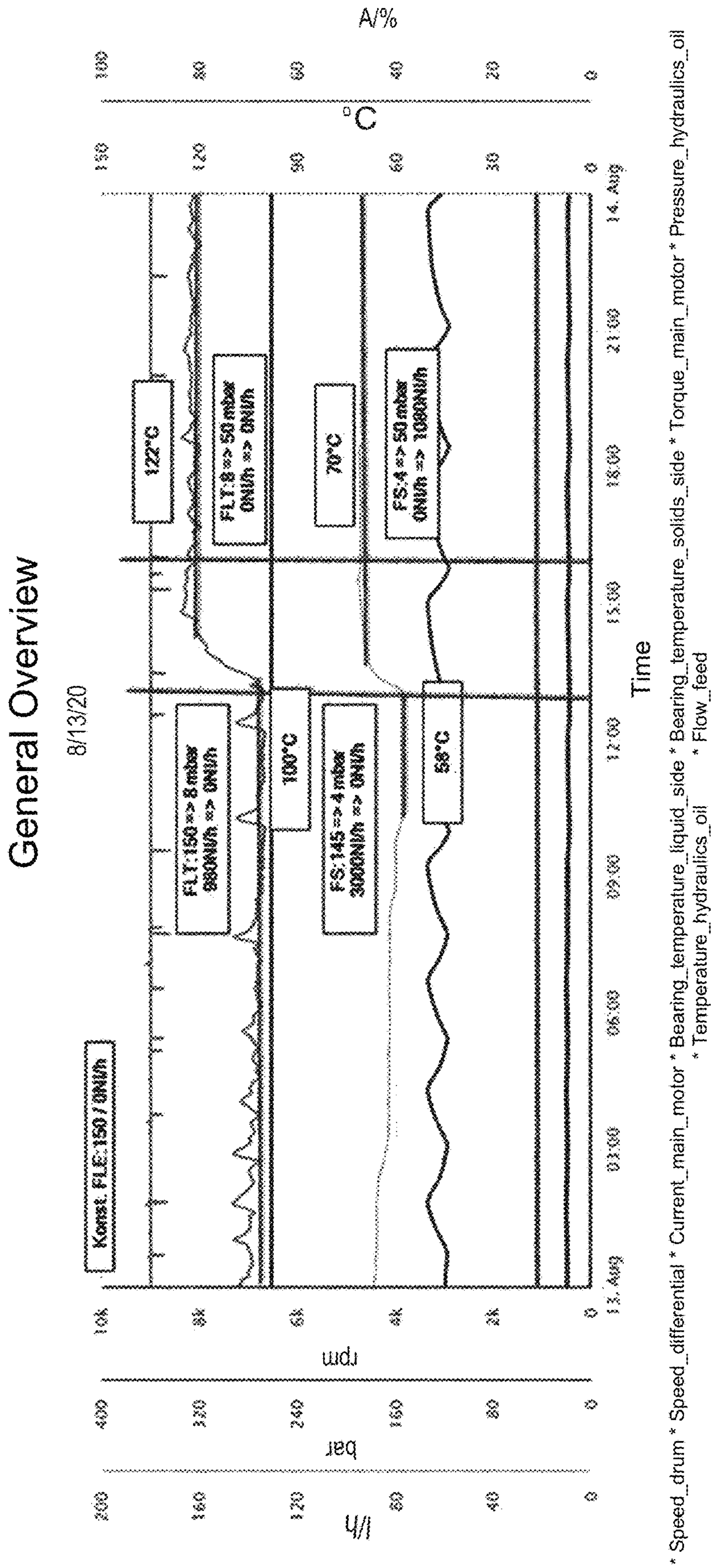
FIG. 4 shows a measurement record of a first test with a radial shaft sealing ring pair on a first bearing "FLT" and a second bearing "FS".

FIG. 4 shows a measurement record of a test on a solid bowl screw centrifuge. The seal diameter in this test is 110 mm and the solid bowl screw centrifuge is operated at a speed of 6500 1/min. In this experiment with a pair of radial shaft sealing rings 400*a, b* and 400*c, d*, respectively, on a first bearing "FLT", the gas pressure $P_{akt}$ in the chamber 402*a, b* between the pair of radial shaft sealing rings was lowered from 150 mbar to 8 mbar. The gas leakage thereby decreases from 980 Nl/h to 0 Nl/h, while the bearing temperature increases from 100° C. to 122° C.

FIG. 4 shows another measurement record of a further test with a pair of radial shaft sealing rings 400*a, b* and 400*c, d*, respectively, on a second bearing "FS", in which the gas pressure $P_{akt}$ in the chamber 402*a, b* between the pair of radial shaft sealing rings was reduced from 145 mbar to 4 mbar. The gas leakage thereby decreased from 3000 Nl/h to 0 Nl/h while the bearing temperature increased from 58° C. to 70° C.

The relationship between increased frictional power of the respective sealing lip 401 and reduced gas pressure $P_{akt}$ in the chamber 402 *a, b* can be clearly seen here.

Figure 5:
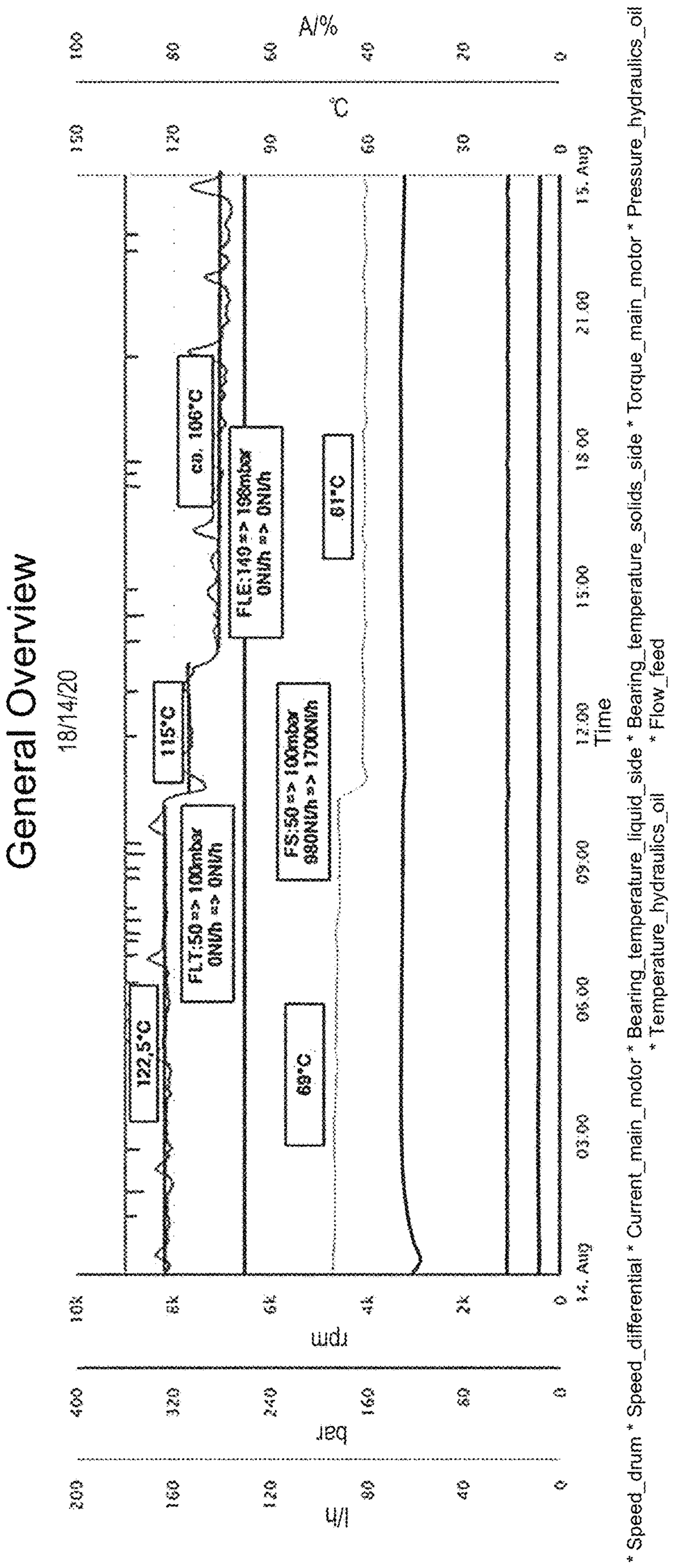
FIG. 5 shows a measurement record of a second test with a radial shaft sealing ring pair on a first bearing "FLT" and a second bearing "FS".

FIG. 5 shows a measurement record of another test on a solid bowl screw centrifuge. In this test, the seal diameter is 110 mm and the solid bowl screw centrifuge is operated at a speed of 6500 1/min. In this experiment with a pair of radial shaft sealing rings 400*a, b* and 400*c, d* respectively on the first bearing "FLT", the gas pressure $P_{akt}$ in the chamber 402*a, b* between the pair of radial shaft sealing rings was increased from 50 mbar to 100 mbar. Gas leakage did not occur and the bearing temperature decreased from 122.5° ° C. to 115° C.

FIG. 5 shows another measurement record of a further test with a pair of radial shaft sealing rings 400*a, b* and 400*c, d*, respectively, on a second bearing "FS", in which the gas pressure in chamber 402*a, b* between the pair of radial shaft sealing rings was increased from 50 mbar to 100 mbar. The gas leakage thereby increased from 980 Nl/h to 1700 Nl/h while the bearing temperature decreased from 69° C. to 61° C.

The relationship between the reduced frictional power of the respective sealing lip 401 at increased gas pressure $P_{akt}$ in the chamber 402 *a, b* can also be seen clearly here.

Thus, for the operation of a solid bowl screw centrifuge in which an inflowing suspension Su is separated in the rotating drum 210 into a solid phase Fe and at least one liquid phase FI, the following method is preferably given:

The gas pressure $P_{akt}$ in the respective chamber 401*a, b* of the respective sealing assembly with two radial shaft sealing rings 400*a, b, c, d* can be adjusted by the control and/or regulating device and by one or more components controllable by this control and/or regulating device, in particular valves and/or a compressor or the like as pressure source.

In this way, the respective chamber is thus subjected to a gas pressure $P_{zu}$, which results in a gas pressure $P_{akt}$ in the chamber.

The gas pressure $P_{akt}$ can be increased by the control and/or regulating device up to a gas pressure $P_{max}$ at which gas leakage starts at a new sealing lip 401 of the respective radial shaft sealing ring 400*a, b, c, d* as it lifts off the shaft.

In this way, the wear at the sealing lip or lips of the respective radial shaft sealing rings 400*a, b, c, d* can be reduced.

In practice, for example, the feed pressure $P_{zu}$ and the orifice plate cross-section of the orifice plate can be selected so that a defined flow rate, for example a flow rate or flow of several hundred Nl/h to several thousand Nl/h, for example about 400 Nl/h (Nl/h: standard volume flow/h) per pair of radial shaft sealing rings (i.e., per chamber) is achieved. In the measurement report of FIG. 4, an example with 3000 Nl/h (with pressure regulation) is included. The amount of the leakage pressure $P_{max}$ corresponding to the defined flow rate of a new sealing assembly 400 can be stored as a reference value—e.g., in the control and/or regulating device 500.

The current leakage pressure $P_{akt}$ in or at the respective chamber can then be measured with a measuring device (not shown). This can be carried out continuously or at defined time intervals.

The currently measured leakage pressure $P_{akt}$ is then compared with the stored reference value(s). This can also be carried out continuously or at defined time intervals.

Thereupon, the current state of wear of the respective sealing assembly 400 can optionally be evaluated. This can be carried out in a simple manner, for example, by means of at least one value table stored in the control and/or regulating unit 500, in which corresponding value pairs of the respective leakage pressure $P_{akt}$ and the associated degree of wear are stored.

A message is generated if the current state of wear exceeds a defined threshold value, so that the respective radial shaft sealing ring 400*a, b, c, d* must be replaced.

This variant thus provides in a simple manner a measurability of the current degree of wear of the sealing lip 401, as well as an estimability or predictability of a total failure of a radial shaft sealing ring 400*a, b, c, d*, so that a predictive maintenance of the radial shaft sealing rings 400*a, b, c, d* is possible.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

100 Housing
101 Collecting chamber
110 Ring or sleeve portion
200 Rotor
210 Drum
211 Cylindrical portion
212 Conical portion
213 Drum cover
214 Feed pipe
215 Distributor
216 Centrifugal chamber
217 Liquid drain
218 Solid discharge
219 Drum shaft portion
220 Drum shaft portion
221 Drum bearing
222 Drum bearing
230 Screw
231 Cylindrical portion
232 Conical portion
233 Screw shaft portion
234 Screw shaft portion
235 Screw bearing
236 Screw bearing
300 Drive device
310 Transmission
320 Belt pulley
330 Belt pulley
400 Sealing assembly
400*a, b, c, d* Radial shaft sealing ring
401 Seal lip
402*a, b* Chamber
403*a, b* Bore
404*a, b* Line
405 Shaft sleeve
406*a, b* Orifice plate
500 Control and/or regulating device
600 Gas source
D Axis of rotation
Su Suspension
Fe Solids
FI Liquid phase
$P_{zu}$ Feed pressure
$P_{max}$ Maximum pressure
$P_{akt}$ Current gas pressure, leakage pressure

The invention claimed is:

1. A method for operating a solid bowl screw centrifuge, which comprises a rotatable drum having an axis of rotation, a cylindrical portion, and a conical portion, a screw arranged in the rotatable drum and rotatable relative to the rotatable drum with a differential speed, at least one or more drum bearings configured to bear the rotatable drum in a housing, at least one sealing assembly arranged between a drum shaft portion and the housing, wherein the at least one sealing assembly is configured to protect at least one of the drum bearings against ingress of constituents of the suspension, wherein the at least one sealing assembly comprises at least two radial shaft sealing rings arranged at a mutual axial spacing to form at least one respective chamber, wherein the at least two radial shaft sealing rings are arranged such that sealing lips of the at least two radial shaft sealing rings are directed away from the at least one respective chamber, the method comprising:

feeding a suspension into the rotatable drum; and separating the suspension, by the rotatable drum, into at least one liquid phase and at least one solid phase, wherein, during the separation, the method further comprises generating, by a gas source operatively connected to the at least one respective chamber via a bore or line, a gas pressure in the at least one respective chamber;

increasing the gas pressure up to a gas pressure at which a radial contact of the sealing lips is overcome so that a gas leakage at the sealing lips of the at least two radial shaft sealing rings starts at a leakage pressure;

measuring, by a pressure measuring device or pressure sensor, a current gas pressure in the at least one respective chamber;

comparing the measured current gas pressure with at least one stored reference value; and determining or evaluating a current state of wear of the sealing lips or of the at least one sealing assembly based on the comparison of the measured current gas pressure and the at least one stored reference value, wherein the bore or the line comprises or forms an orifice plate.

2. The method of claim 1, further comprising:

generating and outputting a message when the current state of wear exceeds a defined threshold value indicative that the at least two radial shaft sealing rings must be replaced.

3. A method for operating a solid bowl screw centrifuge, which comprises a rotatable drum having an axis of rotation, a cylindrical portion, and a conical portion, a screw arranged in the rotatable drum and rotatable relative to the rotatable drum with a differential speed, at least one or more drum bearings configured to bear the rotatable drum in a housing, at least one sealing assembly arranged between a drum shaft portion and the housing, wherein the at least one sealing assembly is configured to protect at least one of the drum bearings against ingress of constituents of the suspension, wherein the at least one sealing assembly comprises at least two radial shaft sealing rings arranged at a mutual axial spacing to form at least one respective chamber, wherein the at least two radial shaft sealing rings are arranged such that sealing lips of the at least two radial shaft sealing rings are directed away from the at least one respective chamber, the method comprising:

feeding a suspension into the rotatable drum; and separating the suspension, by the rotatable drum, into at least one liquid phase and at least one solid phase, wherein, during the separation, the method further comprises generating, by a gas source operatively connected to the at least one respective chamber via a bore or line, a gas pressure in the at least one respective chamber through an orifice plate that limits a feed volume of gas from the gas source into the at least one respective chamber;

setting a feed pressure of the gas upstream of the orifice plate to a gas pressure at which a radial contact of the sealing lips is overcome so that a gas leakage at the sealing lips of the at least two radial shaft sealing rings starts at a leakage pressure;

measuring, by a pressure measuring device or pressure sensor, a current gas pressure in the at least one respective chamber;

comparing the measured current gas pressure with at least one stored reference value; and determining or evaluating a current state of wear of the sealing lips or of the at least one sealing assembly based on the comparison of the measured current gas pressure and the at least one stored reference value, wherein the bore or the line comprises or forms the orifice plate.

4. The method of claim 3, further comprising:

generating and outputting a message when the current state of wear exceeds a defined threshold value indicative that the at least two radial shaft sealing rings must be replaced.

* * * * *